Figure 1:
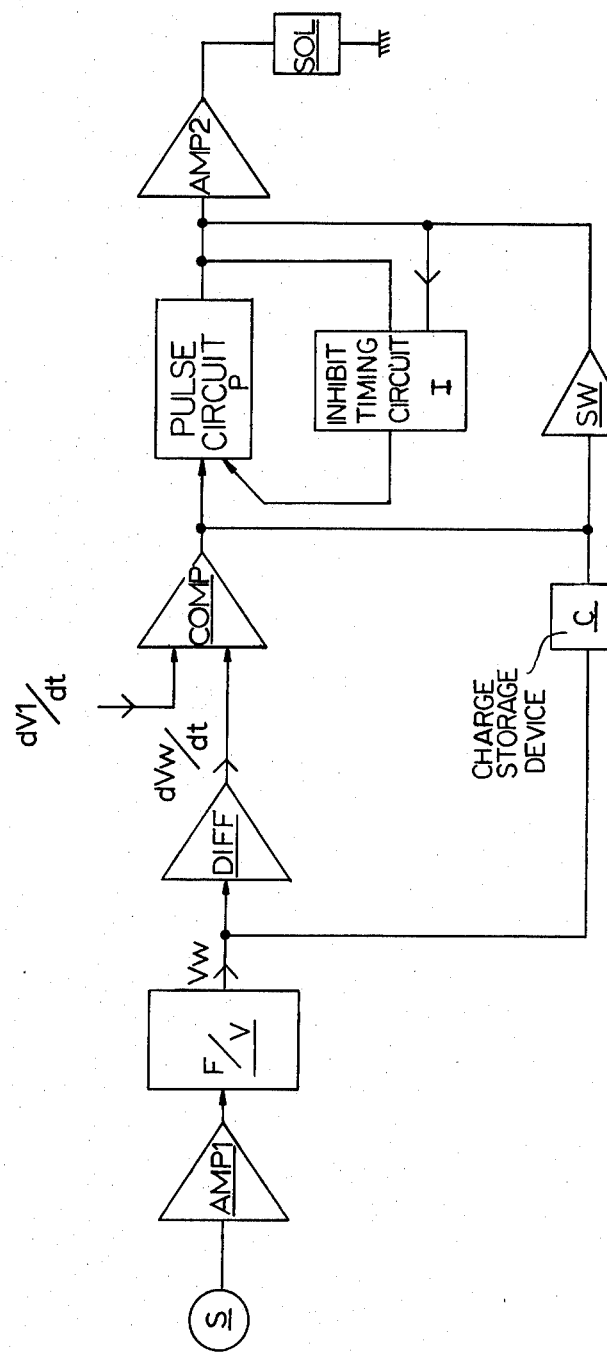

United States Patent [19]

Brearley et al.

[11] 4,230,376
[45] Oct. 28, 1980

[54] ANTI-LOCK BRAKE CONTROL SYSTEM II

[75] Inventors: Malcolm Brearley, Solihull; Alfred K. White, Birmingham, both of England

[73] Assignee: Girling Limited, Birmingham, England

[21] Appl. No.: 893,799

[22] Filed: Apr. 5, 1978

[30] Foreign Application Priority Data

Apr. 5, 1977 [GB] United Kingdom ............... 14239/77

[51] Int. Cl.³ .............................................. B60T 8/02
[52] U.S. Cl. ................................... 303/106; 303/105; 303/110
[58] Field of Search .................... 188/181 A; 244/111; 303/20, 91, 97, 103, 105, 106, 110, 92

[56] References Cited
U.S. PATENT DOCUMENTS

| | | | |
|---|---|---|---|
| 3,469,662 | 9/1969 | Dewar ............................... | 303/97 X |
| 3,697,139 | 10/1972 | Elliott et al. .......................... | 303/91 |
| 3,790,227 | 2/1974 | Dozier ................................. | 303/106 |
| 3,820,857 | 6/1974 | Schnaibel et al. .................... | 303/105 |
| 3,854,779 | 12/1974 | Skoyles et al. ........................ | 303/106 |
| 3,917,353 | 11/1975 | Swiden et al. ....................... | 303/106 |

*Primary Examiner*—Reinhard J. Eisenzopf

*Attorney, Agent, or Firm*—Scrivener, Parker, Scrivener and Clarke

[57] ABSTRACT

In an anti-lock brake control system for a vehicle with braked wheels, a brake pressure release pulse is produced in a manner dependent on wheel deceleration and is processed so that it cannot exceed a preset maximum length and is spaced from any other brake pressure release pulses by a preset inhibit period so that brake pressure release pulses cannot be produced above a certain maximum repetition frequency. A deceleration sensing switch produces an output pulse, and a pulse circuit is triggered by the leading edge of the output pulse to commence said brake pressure release pulse, and is reset by the lagging edge of said output pulse to terminate said brake pressure release pulse. A pulse timing circuit is also triggered by the leading edge of said output pulse and operates to terminate said brake pressure release pulse after said predetermined maximum duration if it has not been terminated already. An inhibit timing circuit is triggered by the brake pressure release pulse from the pulse circuit, and while triggered, produces an inhibit pulse that prevents the pulse circuit from being re-triggered, the inhibit timing circuit resetting to remove said inhibit pulse after expiry of said preset inhibit period following termination of the brake pressure release pulse.

11 Claims, 3 Drawing Figures

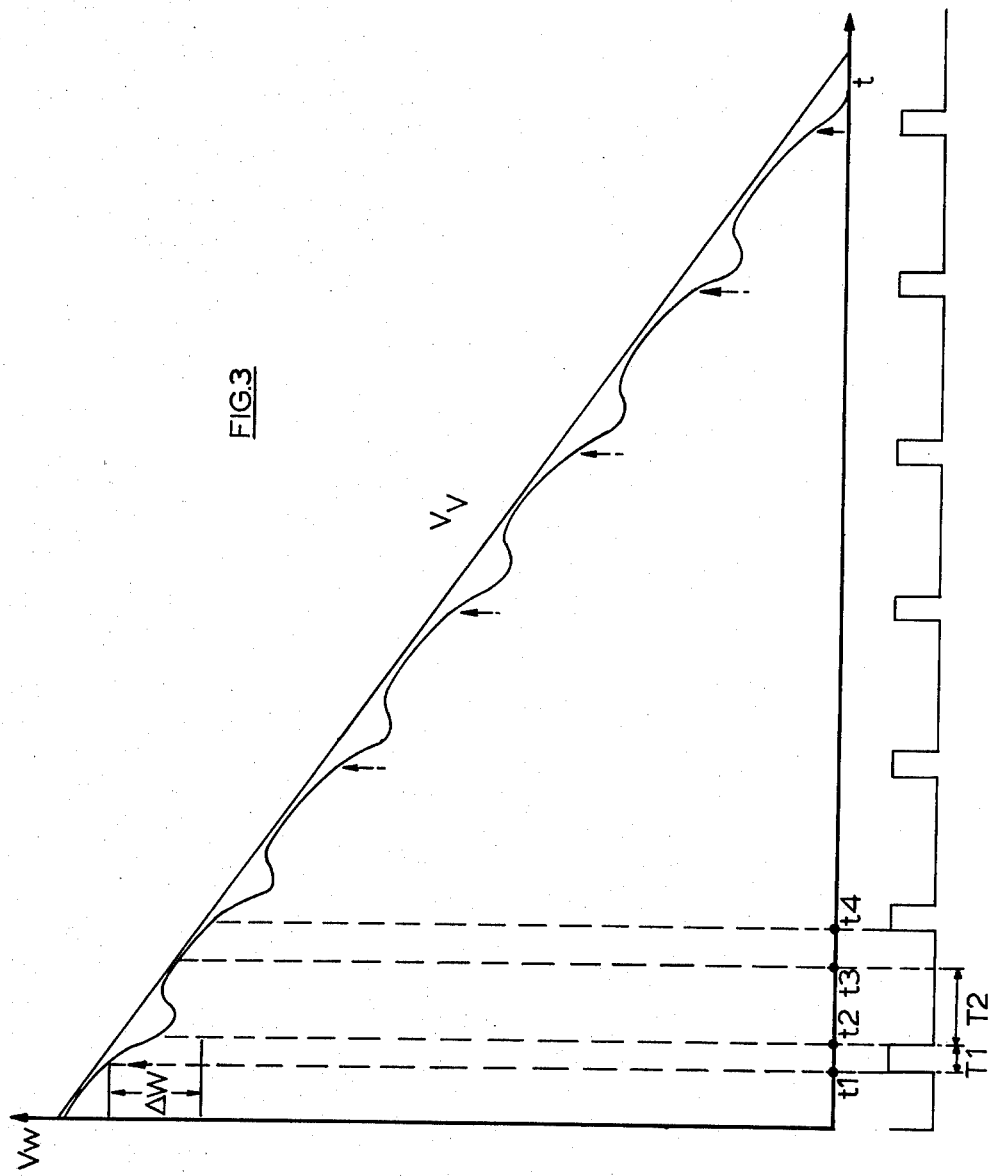

ANTI-LOCK BRAKE CONTROL SYSTEM II

This invention relates to an anti-lock brake control system for vehicles with braked wheels.

Anti-lock brake control systems prevent or minimise wheel lock-up by sensing incipient lock-up and then releasing brake pressure until the wheel recovers in speed and then re-applying the brake pressure and repeating the cycle as often as necessary. It has been proposed to detect incipient wheel lock-up by producing an electrical wheel speed signal, feeding this to a linear differentiator capable of producing an acceleration/deceleration signal, and comparing the deceleration signal with a predetermined threshold deceleration in a comparator so as to detect any deceleration in excess of said threshold and produce a corresponding output pulse to control the release of brake pressure whilst said threshold is exceeded.

A problem with this proposed system is that the use of a differentiator with a fast response so as to allow rapid sensing of incipient wheel lock-up, makes the system susceptible to non-skid deceleration signals produced by rough road conditions. These spurious skid signals generally occur as short and frequent pulses that in turn cause short and frequent brake pressure release pulses so that braking pressure is seriously reduced.

The present invention reduces or overcomes this problem by arranging that the output pulse produced by the comparator triggers a brake pressure release pulse of a preset maximum duration, and that the production of a brake pressure release pulse is inhibited for a preset time following the last such pulse so that the pulses cannot be produced above a certain maximum repetition frequency irrespective of more frequent variations in the wheel deceleration signal.

The pulse/space ratio of the brake pressure release pulses of maximum duration at the maximum frequency is chosen so as to provide an acceptable overall braking pressure. The control action then leads to a check on the level of the applied braking rather than a loss of braking effort and represents the best braking compromise on rough roads where overbraking can easily occur.

In particular, the present invention consists in an anti-lock brake control system for vehicles with braked wheels comprising a wheel speed sensor for producing a signal proportional to wheel speed, a differentiator that receives the wheel speed signal from said sensor and produces a corresponding acceleration/deceleration signal, a comparator that receives said acceleration/deceleration and responds by producing an output pulse while said acceleration/deceleration signal exceeds a predetermined deceleration threshold, a pulse circuit that is triggered by said output pulse signal and produces a brake pressure release pulse of a predetermined maximum duration, and an inhibit timing circuit that inhibits re-triggering of the pulse circuit for a predetermined duration after said brake pressure release pulse has terminated.

Preferably, the leading edge of the output pulse from the comparator, representing the onset of skidding, triggers said pulse circuit to initiate said brake pressure release pulse, and a pulse timing circuit terminates the brake pressure release pulse after said maximum duration if the lagging edge of the output pulse from the comparator does not first terminate the brake pressure release pulse. The inhibit timing circuit is triggered by the brake pressure release pulse and produces an inhibit pulse to prevent re-triggering of the pulse circuit for said predetermined duration after the brake pressure release pulse has ended.

Figure 2:
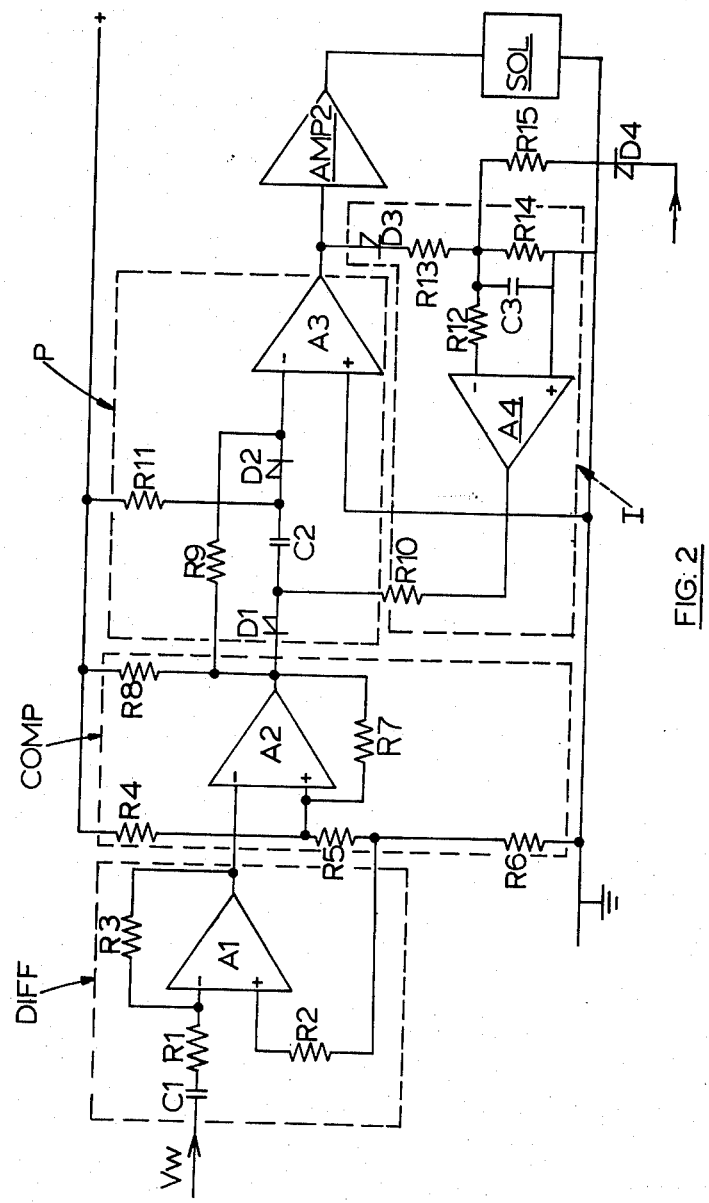

The invention will now be described by way of example with reference to the accompanying drawings in which:

FIG. 1 is a schematic diagram of an anti-lock brake control system according to the invention, FIG. 2 is a circuit diagram of the system of FIG. 1, and FIG. 3 shows a graph of wheel speed against time and corresponding brake pressure release pulses for the system of FIGS. 1 and 2 when operating to prevent wheel lock-up.

The illustrated anti-lock brake control system comprises a sensor S that produces a pulse signal with a repetition frequency proportional to the speed of a braked wheel, an amplifier AMP 1 that amplifies the pulse signal and feeds it to a frequency/voltage convertor circuit F/V that produces a corresponding wheel speed voltage signal Vw. The wheel speed voltage signal Vw is differentiated in a differentiator DIFF to produce a signal dVw/dt proportional to wheel acceleration/deceleration, and this signal dVw/dt is compared with a deceleration threshold $dV_1/dt$ in a comparator COMP. When the signal dVw/dt exceeds the threshold $dV_1/dt$ as the braked wheel decelerates, the comparator COMP produces an output pulse, the leading edge of which triggers a pulse circuit P and causes the latter to produce a brake pressure release pulse that is amplified in an amplifier AMP 2 and energises a solenoid SOL to release brake pressure. The pulse circuit P is such that it is reset by the lagging edge of the output pulse from the comparator COMP if this occurs within a predetermined maximum time TI of the pulse circuit being triggered, but otherwise resets automatically after time lapse TI to limit the duration of the brake pressure release pulse. An inhibit timing circuit I prevents the pulse circuit P from being triggered again for a predetermined time T2 after said brake pressure release has terminated.

FIG. 2 shows that the differentiator DIFF comprises a linear, rapid response, operational amplifier A1 that receives the wheel speed signal Vw via a capacitor C1 and resistor R1. The comparator COMP is formed by an operational amplifier A2 with a reference input from a potential divider R4,R5,R6 corresponding to the deceleration threshold $dV_1/dt$ of the comparator. The potential divider R4,R5,R6 also produces the quiescent voltage via resistor R2 for the operational amplifier A1 in order to compensate for changes in the supply voltage. Positive feedback via resistor R7 assists rapid switching of comparator A2 at its threshold setting.

The pulse circuit P comprises an operational amplifier A3 with an input bias connection via a resistor R11 and diode D2, a pulse timing circuit comprising a diode D1, a capacitor C2 and resistor R11 connected between the output of the comparator A2 and the diode D2 in the input of the amplifier A3, and a reset connection via a resistor R9 between the output of the comparator A2 and the input of the amplifier A3. An input current via resistor R11 and diode D2 normally holds amplifier A3 in a low output condition in which the brake pressure release solenoid SOL is de-energised. However, if the comparator A2 is triggered by the deceleration signal exceeding the threshold level $dV_1/dt$, it produces a negative pulse which passes via diode D1 and capacitor C2 and renders diode D2 non-conducting for a preset period T1 determined by capacitor C2 and resistor R11, capacitor C2 being charged by said negative pulse and then discharging via resistor R11 until it allows diode D2 to conduct again. While diode D2 is non-conducting, the amplifier A3 produces a positive output pulse which passes via the amplifier AMP 2 to energise the solenoid SOL. This output pulse terminates immediately if the comparator A2 resets and gives a high output which passes via resistor R9 to reset amplifier A3 to the low output condition. Otherwise, the output pulse from amplifier A3 terminates after said predetermined maximum duration TI set by the capacitor C2 and resistor R11.

The output from amplifier A3 is also connected to the inhibit timing circuit I comprising a capacitor C3 and operational amplifier A4. The positive output pulse from amplifier A3 charges capacitor C3 substantially to the full supply voltage via diode D3 and potential divider R13,R14, and this in turn triggers amplifier A4 which produces a low output signal that isolates capacitor C2 from comparator A2. Thus, while amplifier A4 is held triggered by the charge on capacitor C3, the pulse circuit A3 cannot be retriggered by the comparator A2. This inhibit action lasts until capacitor C3 discharges sufficiently to cause amplifier A4 to reset and produce a positive output signal, capacitor C3 commencing to discharge once the positive output pulse from amplifier A3 terminates, and discharging for said predetermined time T2 before amplifier A4 resets.

Typically, the maximum duration TI of the brake pressure release pulse from the pulse circuit is 15 to 45 mS and the duration T2 of the inhibit pulse is 300 mS.

FIG. 3 illustrates how the anti-lock brake control system operates to control braking on high $\mu$ surfaces where the brakes have a rapid response and wheel speed recovery following brake pressure release is rapid. As the brakes are applied, wheel speed Vw falls and at the preset deceleration threshold $dV_1/dt$ (time t1 in FIG. 3), the comparator COMP triggers the pulse circuit P and causes the latter to produce a brake pressure release pulse that energises the solenoid SOL. Brake pressure therefore released, and the wheel, after reaching a peak deceleration, begins to accelerate. After the pulse circuit P has been triggered for the predetermined time T1, it resets terminating the brake pressure release pulse (time t2 in FIG. 3). The deceleration level at this time is still in excess of the threshold deceleration level $dV_1/dt$. If it had fallen to this level before time t2, the brake pressure release pulse would have been terminated at this earlier time.

The wheel continues to accelerate towards the falling vehicle speed Vv, even though brake pressure is now being re-applied, but eventually wheel speed begins to fall again until the deceleration threshold $dV_1/dt$ is again exceeded (at time t4 in FIG. 3). If this deceleration threshold is reached within the predetermined time period T2 since the last brake pressure release pulse (before time t3 in FIG. 3), the production of another brake pressure release pulse is inhibited until the end of this period T2. However, if, as shown in FIG. 3, the deceleration threshold $dV_1/dt$ is reached after the inhibit period T2 has expired, the next brake pressure release pulse is triggered immediately (at time t4).

The anti-lock brake control system, as described above, may be used in conjunction with a back-up system which controls brake pressure release under conditions where the brakes are not responsive to the limited brake pressure release pulse or where $\mu$ is too low to promote wheel speed recovery with the limited reduction in brake pressure caused by said limited brake pressure release pulse. However, the back-up system will generally respond more slowly in producing a back-up pressure release pulse, and thus even in this dual channel control system, the limited brake pressure release pulse causes brake pressure release to be commenced earlier and thus the depth of the wheel skid cycle will be reduced.

FIG. 1 illustrates such a dual channel control system in which the back-up channel includes a deceleration sensing switch SW with an input that receives the wheel speed voltage signal Vw via a charge storage device C and has a control connection from the comparator COMP. The output pulse from the comparator causes the switch SW to be triggered and to feed a brake pressure release pulse to the amplifier AMP 2 once a preset fall in wheel speed Δw occurs. When as shown in FIG. 3, the wheel speed drop Δw does not occur the switch SW is not triggered.

The charge storage device C accumulates a charge dependent on the dip in the wheel speed while the deceleration switch SW is triggered. Decay of this charge is restricted by the output pulse from the comparator COMP while this pulse is produced, but once this pulse has terminated, the charge decays in a predetermined manner until a predetermined charge level is reached, at which level, the switch SW resets, terminating the brake pressure release pulse.

This dual channel control system is described in more detail in our copending U.S. patent application Ser. No. 893,798.

The brake pressure release pulse from the switch SW of the back-up channel can be used to operate the inhibit timing circuit I so that it prevents the pulse circuit P from being triggered again for a predetermined time after the pulse from SW has terminated. As shown in FIG. 2, the control connection from the switch SW to the inhibit timing circuit comprises a connection via a diode D4 and resistor R15 to the capacitor C3 so that the brake pressure release pulse from SW causes capacitor C3 to be charged, whereupon it triggers the amplifier A4 to isolate capacitor C2 from comparator A2, as already described above. Once the pulse from switch SW terminates, capacitor C3 discharges and resets amplifier A4, but this discharge time need not be the same as the discharge time T2 when the inhibit circuit is triggered by the pulse circuit P. Instead, a different discharge time can be produced by arranging that the capacitor is charged to a different level by the pulse from switch SW via the diode D4 and resistor R15.

We claim:

1. An anti-lock brake control system for vehicles with braked wheels comprising a wheel speed sensor for producing a signal proportional to wheel speed, a differentiator that receives the wheel speed signal from said sensor and produces a corresponding acceleration/deceleration signal, a comparator that receives said acceleration/deceleration signal and responds by producing an output pulse while said acceleration/deceleration signal exceeds a predetermined deceleration threshold, a pulse circuit that is triggered by said output pulse signal and produces a brake pressure release pulse of a predetermined maximum duration, and an inhibit timing circuit that inhibits re-triggering of the pulse circuit for a predetimined duration after said brake pressure release pulse has terminated irrespective of the duration of said brake pressure release pulse.

2. A system as claimed in claim 1 in which the pulse circuit is such as to be triggered by the leading edge of said output pulse to commence said brake pressure release pulse, and to be reset by the lagging edge of said output pulse to terminate said brake pressure release pulse; and in which the pulse circuit includes a pulse timing circuit that is triggered by the leading edge of said output pulse and operates to terminate said brake pressure release pulse after said predetermined maximum duration if it has not been terminated already.

3. A system as claimed in claim 2 in which the pulse circuit includes a switch that is triggered by the leading edge and reset by the lagging edge of said output pulse and produces said brake pressure release pulse whilst triggered, and in which the pulse timing circuit includes a capacitor that is connected between the output of the comparator and an input of the switch to be charged in passing a trigger pulse to the switch and to discharge at a predetermined rate thereafter until it causes the switch to reset after said predetermined maximum duration.

4. A system as claimed in claim 3 in which the pulse circuit includes a reset connection between the output of the comparator and the input of the switch so that termination of the output pulse resets the switch.

5. A system as claimed in claim 1 in which the inhibit timing circuit is triggered by the brake pressure release pulse and whilst triggered produces an inhibit pulse that prevents the pulse circuit from being re-triggered, the inhibit timing circuit resetting to remove said inhibit pulse said predetermined time after the brake release pulse terminates.

6. A system as claimed in claim 5 in which the inhibit timing circuit comprises a capacitor that is charged by the brake pressure release pulse and controls operation of a switch that produces the inhibit pulse.

7. A system as claimed in claim 1 which includes a deceleration sensing switch that responds to the wheel speed signal and produces a brake pressure release pulse after said deceleration threshold is exceeded.

8. A system as claimed in claim 7 in which the deceleration sensing switch is controlled by the output pulse so that it produces a brake pressure release pulse as soon as a predetermined drop in wheel speed occurs after the output is produced.

9. A system as claimed in claim 8 in which the wheel speed signal is fed to the deceleration sensing switch via a charge storage device that accumulates a charge dependent on the dip in wheel speed while the deceleration sensing switch produces a brake pressure release pulse, discharge of the capacitor being restricted by the output pulse but proceeding in a predetermined manner once the output pulse terminates until, at a predetermined charge level, it resets the deceleration sensing switch to terminate the brake pressure release pulse.

10. A system as claimed in claim 7 in which the brake pressure release pulse from the deceleration sensing switch controls the pulse circuit so that it is inhibited from being triggered for a predetermined duration after the brake pressure release pulse from the deceleration sensing switch has terminated.

11. A system as claimed in claim 10 in which the pulse circuit is inhibited from being triggered for different predetermined durations by the pulse from the comparator and the pulse from the deceleration sensing switch.

* * * * *